July 13, 1926.
J. H. WAGENHORST
1,592,056
RIM FOR AUTOMOBILE TIRES
Filed April 16, 1921
2 Sheets-Sheet 1
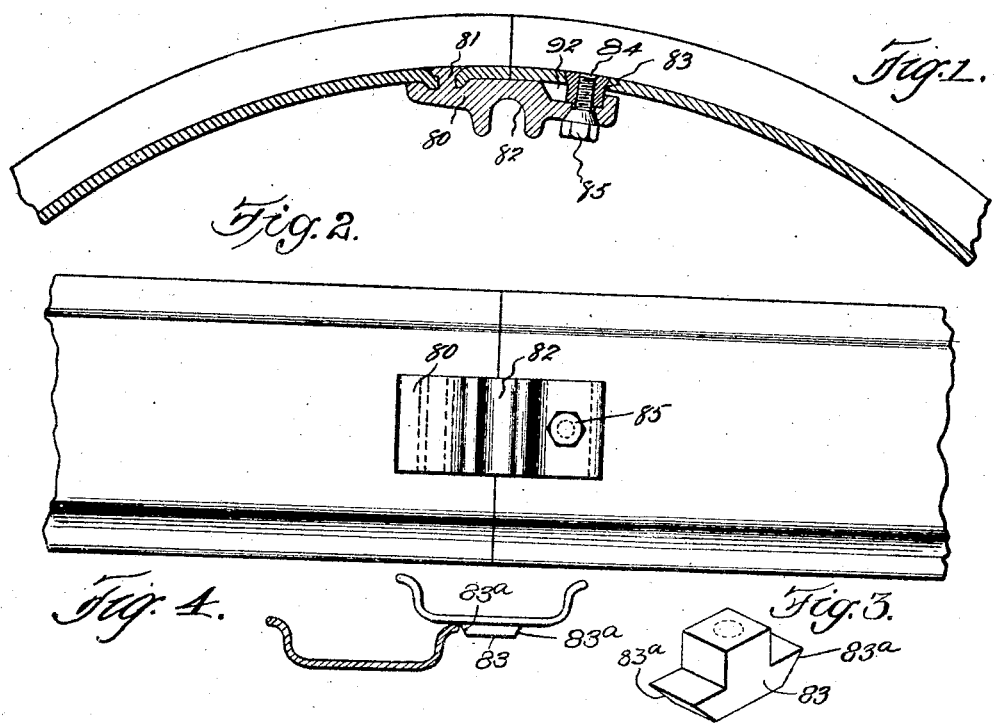
Inventor
J. H. Wagenhorst
By
Hull Brock & West
Attys.

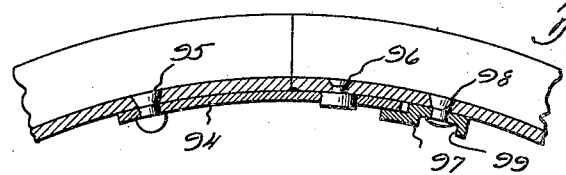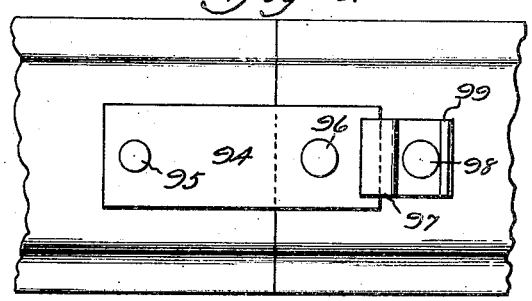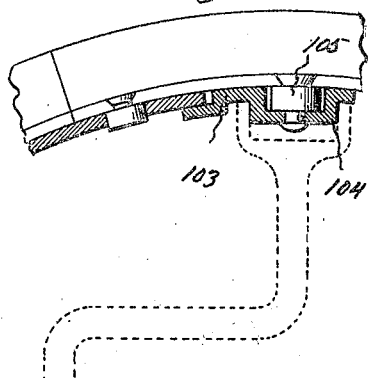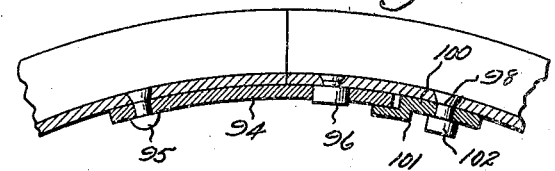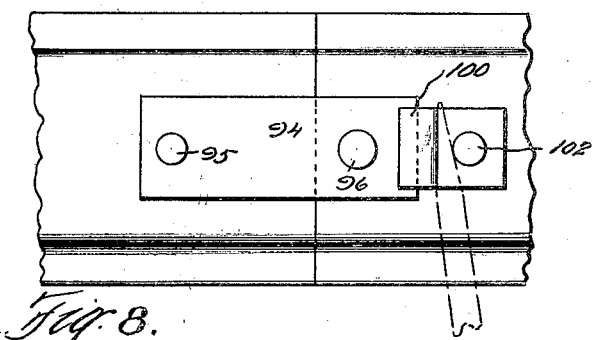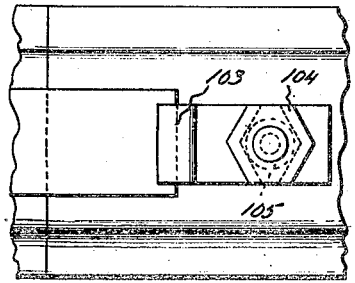

Patented July 13, 1926.

1,592,056

UNITED STATES PATENT OFFICE.

JAMES H. WAGENHORST, OF JACKSON, MICHIGAN.

RIM FOR AUTOMOBILE TIRES.

Application filed April 16, 1921. Serial No. 461,846.

This invention relates generally to rims for automobile tires and more particularly to transplit demountable tire carrying rims. The object of the present invention is to provide certain novel forms of connecting plates for uniting the ends of said transplit rims.

Another object of the invention is to provide certain novel forms of combined tie plate and driving connection whereby the ends of the rim are connected together and a driving connection provided between the fixed and demountable rims.

With these various objects in view the invention consists in the novel features of construction hereinafter fully described and set forth in the appended claims.

In the drawings forming a part of this specification Fig. 1 is a detail sectional view showing a connecting plate embodying my invention; Fig. 2 is an inner plan view of the same; Fig. 3 is a detail perspective view of the lug illustrated in Figs. 1 and 2; Fig. 4 is a detail view illustrating the manner of shifting the ends of the transplit rim laterally; Fig. 5 is a detail sectional view of another form of tie plate and latch; Fig. 6 is an inner plan view of the same; Fig. 7 shows a slight modification; Fig. 8 is an inner plan view of the same; Fig. 9 is a sectional view of a slightly modified form of latch; and Fig. 10 is an inner plan view of the same.

I accomplish the objects of my invention by providing the connecting plate 80 which is riveted at 81 to one end of the transplit demountable rim and extends beyond the split in said rim and has a transverse curved or recess portion 82 adapted to receive or straddle the rim bolt which is used to secure the demountable rim on the fixed rim. The free end of the connecting plate 80 is adapted to engage the lug 83 fastened to the opposite end of the rim and a bolt 84 having a conical head 85 is adapted to rigidly fasten the connecting plate to the lug, the conical head of the bolt seating in a counterbored opening produced in the free end of the connecting plate. By this construction the plate is locked securely in place and the conical head of the bolt binding tightly against the counterbored opening is securely locked against rotation. The ends of the lug 83 are beveled or inclined as shown at 83ª and this greatly facilitates the lateral shift of the rim ends as when the side flange of the rim contacts with the beveled edge 83ª, it will slide freely beneath the same and will not bind as would be the case were the end of the lug made square. It will be noted that in the construction shown in Fig. 1 a space 92 is provided between the connecting plate and rim for the insertion of a screw driver or rim operating tool and by means of which the free end of the plate can be readily disconnected from the lug when it is desired to collapse the rim.

In the construction shown in Figs. 5 and 6, the plate 94 is riveted to one end of the rim at 95 and engages the lug 96, and the latch is formed with an offset portion 97 engaging the end of the plate 94, while the other end of the latch is turned radially inward at 99. This latch is pivoted to the end of the rim at 98. The end of a screw driver or suitable tool may be inserted between the flange 99 and the offset portion 97 and used to turn the latch on its pivot 98. In the construction shown in Figs. 7 and 8, the latch 100 is formed with an offset portion 101 engaging the end of the plate 94 and the pivot 98 by which the latch is pivoted to the end of the rim is formed with a head 102 so that the end of a screw driver or other tool can be inserted between the offset portion 101 and the head 102 of the rivet and used to turn the latch on its pivot 98. In the form shown in Figs. 9 and 10 the latch 103 is formed with a hexagonal shaped portion 104 and the pivot 105 fits upon the interior of said portion while the exterior of said portion is adapted for engagement with a wrench shown in dotted lines in Fig. 9.

It will thus be seen that I have provided an improved form of connecting plate and latch for joining the ends of a transplit demountable rim which securely holds the ends in proper engagement and registration and is so constructed as to lend itself to the lateral separation of the rim ends in collapsing the rim. I am aware that the particular construction illustrated may be changed without departing from the spirit of my invention and, therefore, I claim my invention broadly, as indicated by the appended claims.

Having thus described my invention, what I claim is:

1. The combination with a transplit rim, of a connecting plate secured to one end of said rim and bridging the split therein, a lug attached to the opposite end of said rim and having tapered sides arranged in front and rear with respect to the rim and a side surface lying in a radial plane with respect to the rim, the free end of said connecting plate having an outwardly-extending portion engaging said last-mentioned side surface of the lug, and a bolt extending through said plate and screwed into said lug.

2. The combination with a transplit rim, of a connecting plate secured to one end of said rim and bridging the split therein, a lug attached to the opposite end of said rim and having tapered sides arranged in front and rear with respect to the rim and an untapered side surface, the free end of said connecting plate having an outwardly-extending portion engaging said untapered surface of the lug, and a bolt extending through a countersunk hole in said plate and screwed into said lug, said bolt having a conical head engaging the countersunk portion of the hole.

3. The combination with a transplit rim, of the connecting plate secured to one end of said rim and bridging the split therein, a lug attached to the opposite end of said rim and having tapered sides arranged in front and rear with respect to the rim and a side surface lying in a radial plane with respect to the rim, the free end of said connecting plate having a portion engaging said last-mentioned side surface of the lug, and detachable means engaging said lug for preventing movement of the plate with respect thereto.

In testimony whereof, I hereunto affix my signature.

JAMES H. WAGENHORST.